United States Patent [19]
Satterfield et al.

[11] Patent Number: 5,343,409
[45] Date of Patent: Aug. 30, 1994

[54] SYSTEM AND METHOD FOR PROBING OBJECT RESOURCES IN A WINDOW SERVER ENVIRONMENT

[75] Inventors: Wade J. Satterfield; Robert A. Morain, both of Ft. Collins, Colo.

[73] Assignee: Hewlett-Packard Company, Palo Alto, Calif.

[21] Appl. No.: 751,919

[22] Filed: Aug. 29, 1991

[51] Int. Cl.$^5$ .................................................. G06F 7/00
[52] U.S. Cl. ..................................... 364/514; 395/700; 371/19
[58] Field of Search .................. 364/152, 550, DIG. 1, 364/514, 516; 371/19; 395/62, 700

[56] References Cited

U.S. PATENT DOCUMENTS

| | | |
|---|---|---|
| 4,064,561 | 12/1977 | Jennings . |
| 4,075,604 | 2/1978 | Degasperi . |
| 4,441,205 | 4/1984 | Berkin et al. . |
| 4,569,049 | 2/1986 | McNamara . |
| 4,617,663 | 10/1986 | Lake et al. . |
| 4,953,165 | 8/1990 | Jackson . |
| 5,038,348 | 8/1991 | Yoda et al. ............................ 371/19 |
| 5,062,045 | 10/1991 | Janis et al. ........................ 371/19 X |
| 5,133,075 | 7/1992 | Risch ................................. 395/62 X |
| 5,142,679 | 8/1992 | Owaki et al. ..................... 371/19 X |

OTHER PUBLICATIONS

"CAPBAK/X-Test Capture/Replay for XWindows", Technical Specifications, May, 1, 1990.
"preVue for the X Window System", Marketing Literature, Copyright 1990.
"Empower/X", Marketing Literature, Copyright 1990.
"The Atron Evaluator", marketing brochure, Copyright 1989.
"XSCOPE(1)", Description and instructions, X version 11, Sep. 8, 1988.
"XTM", Description and instructions, Copyright 1986-1989.

*Primary Examiner*—Jack B. Harvey
*Assistant Examiner*—Edward Pipala

[57] ABSTRACT

A computer-based system and method for obtaining specified resources of an object within a functional process in an object-oriented window server environment where the functional process contains this resource information, and for communicating these specified resources to an outside functional process. The outside functional process can use this information in a variety of ways, particularly for testing purposes.

9 Claims, 4 Drawing Sheets

SYSTEM AND METHOD FOR PROBING OBJECT RESOURCES IN A WINDOW SERVER ENVIRONMENT

BACKGROUND OF THE INVENTION

1. Field Of The Invention

The present invention is a system and method for obtaining resource information within an object located in a target functional process. More specifically, the present invention relates to a computer-based system and method for obtaining resource information within an object in a target functional process in a window server environment, where the names of the objects are not retained by the window server. It is contemplated that this resource information can be used for many purposes, especially for those relating to the testing of various versions of target functional processes in an object-oriented environment.

2. Related Art

The concept of dividing a display device into multiple "windows" (i.e., multiple regions each representing a separate functional process such as an application program or portion thereof) has become a popular user interface for computers. To facilitate control of these windows, "window servers" have been developed. These window servers manage the windows on a display device and perform such functions as redirecting input signals to the proper functional process represented by a window to which the input signals were initially directed. Thus, if a pointer device (such as a mouse) is used to "point" to a particular window on a display screen, then any input signals generated by the pointer device or keyboard will be re-directed by the window server to the application program (or portion thereof) that the window represents. An example of a widely used window server is the X Window System developed at the Massachusetts Institute of Technology of Cambridge, Mass.

The functional processes receive their input from a window server as a stream of input events. Input events can represent, for example, pointer device motion, keyboard key presses, pointer button releases, window size changes, etc, from an input device. However, the input events received by the functional processes are typically more than just redirected input signals. For example, the window server might receive the input signal from the input device, and from it determine the internal label that the window server has given to the window ("window ID") and the specific coordinates of the display device at which the "event action" of the input event is directed. This would then be the information sent to the functional processes. Thus, in this example, the window server would have to maintain the names of all of the windows of each functional process.

In order to properly direct input events to the various functional processes, typical window server environments use a concept of "ownership" of a window. Thus, each window is said to belong to some functional process, and any input event directed at a window is then accessible by the window's owner (via the window server).

Many window-oriented environments used with some window servers are "object-oriented." This means that entities such as functional processes (or portions thereof) are represented to the user as objects (often in the form of icons, menus, scrollbars, and text fields).

In a programming sense, an object is a combination of data and subroutines. A user can create the object and then need not service it since it will take care of itself (i.e, it has "methods" which instruct it what to do). For example, a "push button" object will contain all of the data and subroutines it needs to draw itself on the screen, know to ignore certain keystrokes directed at it, redraw its image when its window changes size, etc. Objects often contain a data field containing a name that the programmer gave to the object when it was created.

In some window-oriented environments the objects are divided into "widgets" and "gadgets." A widget is an object that has its own window (and thus its own window ID), and a gadget is an object that does not (i.e., there can be many gadgets in a single window). In such an environment a user may not know if an object shares a window with another object or if the object occupies the whole window (i.e., it is unclear whether an object is a widget or a gadget).

Since objects can typically contain other objects, the full name of an object comprises the name of the object itself (i.e., the name the programmer gave to it) plus the names of any higher-level objects (e.g., parent, grandparent, etc.) and the name of the functional process itself. In some window server environments, the window server can keep track of the name of each widget and gadget. However, some of the more recent window server environments such as those using "Motif" objects (developed by the Open Software Foundation of Cambridge, Mass) do not provide facilities for allowing the window server to store the name of the object. This makes it much more difficult to obtain object names, since the functional process itself must be analyzed to obtain this information.

In some window server environments such as those where the object names are not easily obtained, a data structure of objects representative of all the objects used in a functional process is stored within the functional process. Each object contains within it information or "resources" about that object. Such information can include the size and color the object should be if it is mapped (i.e., displayed) on a display screen, as well as other information such as its current window ID. This information can be of great use to entities outside the functional process (e.g., other functional processes), especially in a software testing environment. However, it is difficult to forward this information to other outside functional processes due to constraints of the window server environment.

Also, in some window server environments an "event description" is used to convey information outside the functional process about the input event directed to a particular object. This event description can be a subset of the information in the input event and/or can include additional information as well. In any case, the event description typically describes the "event action" which was directed to the object in the input event (e.g., a button was pressed).

Window servers such as the X Window System mentioned above often require functional processes using them to process many detailed events and to draw pictures and text using very low level functions. Libraries of higher level functions are available that make programming of the functional processes easier. One of these libraries for the X Window System is the X Window System Toolkit from the Massachusetts Institute of Technology. In addition to what is mentioned above, such libraries in the X Window System can also be used to determine the name of an object at which an input event is directed. However, in such a system if it is desired to pass the object name to an entity outside of the functional process, it is often the case that the object name is too large to be passed via an event description. Thus, some other mechanism would have to be used if the name of an object was desired by such an outside entity.

In today's software development environment, application programs are tested in some manner before being sold. Often testing is done by simply running the application program by hand. A logical extension of this is to run the application program (i.e., the functional process) by hand, and record both the input of the user (into a script) and the output generated by the functional process (which typically comprises data related to the output on a visual display device). Then, when subsequent versions of the functional process are developed (or run on different pieces of hardware) the information in the script can be automatically re-played and the resultant output can be compared with the previously recorded output. It should be noted that a previously recorded script can be used for purposes other than testing functional processes, such as for automated demonstrations.

When comparing previously recorded output to newly captured information, one can use the pixels generated by a display device as the basis for comparison. Thus, either all or a portion of the pixels of a display device can be captured and recorded in a script during the first execution of the functional process, and when the functional process is re-played the pixels of the display device are again captured and compared with those which were stored.

XTM is a tool developed by Hewlett-Packard Corporation of Palo Alto, CA that can generate and play back scripts for application programs utilizing the X-Server System, and which utilizes the pixel-capture technique described above.

Tools such as XTM are deficient for use in an object-oriented environment, however, in that everything is based upon coordinates. Thus, if the objects are repositioned by the window server or the display device is of a different resolution than the one used to record the script, then the recorded script will be of little use in playing back that which was recorded. To adequately determine whether one version of a functional process performs the same as a subsequent version in an object-oriented environment, however, one can compare the resources of an object (which would give an indication of what the output would look like in terms of the objects' internal representation of size, color, etc., but would not take into account the objects' absolute positions on a display screen) from one run of a functional process to the next.

Thus, what is needed is a system and method for obtaining the information of resources from an object in a window server environment where each functional process, rather than the window server, keeps track of object resources. This information can then be used for software testing purposes of many different types.

SUMMARY OF THE INVENTION

The present invention overcomes the deficiencies of the devices described above by providing a system and method for obtaining specified resources of an object within a functional process in a window server environment where the functional process contains this resource information, and for communicating these specified resources to an outside functional process. More specifically, a probe device (acting as the "outside" functional process) is used to forward an object to be probed and a resource to be attained (i.e., a "resource request") to a target functional process. Using this information, embedded code within the target functional process obtains the specified resource information and sends it back to the probe device.

Environments contemplated for use with the present invention envision that the specified resource information can be used for any number of purposes, including satisfying the curiosity of a user by placing the resource information on a display screen. In addition, the resource information could be stored in a script to be compared with subsequently generated resource information or it could be compared with resource information previously generated.

BRIEF DESCRIPTION OF THE DRAWINGS

Various objects, features, and attendant advantages of the present invention can be more fully appreciated as the same become better understood with reference to the following detailed description of the present invention when considered in connection with the accompanying drawings, in which.

DETAILED DESCRIPTION OF THE PREFERRED EMBODIMENTS

I. GENERAL OVERVIEW

The present invention is a system and method for obtaining resource information within an object located in a target functional process. More specifically, the present invention relates to a computer-based system and method for obtaining resource information within an object in a target functional process in a window server environment, where the names of the objects are not retained by the window server. It is contemplated that this resource information can be used for many purposes, especially for those relating to the testing of various versions of target functional processes in an object-oriented environment.

Figure 1:
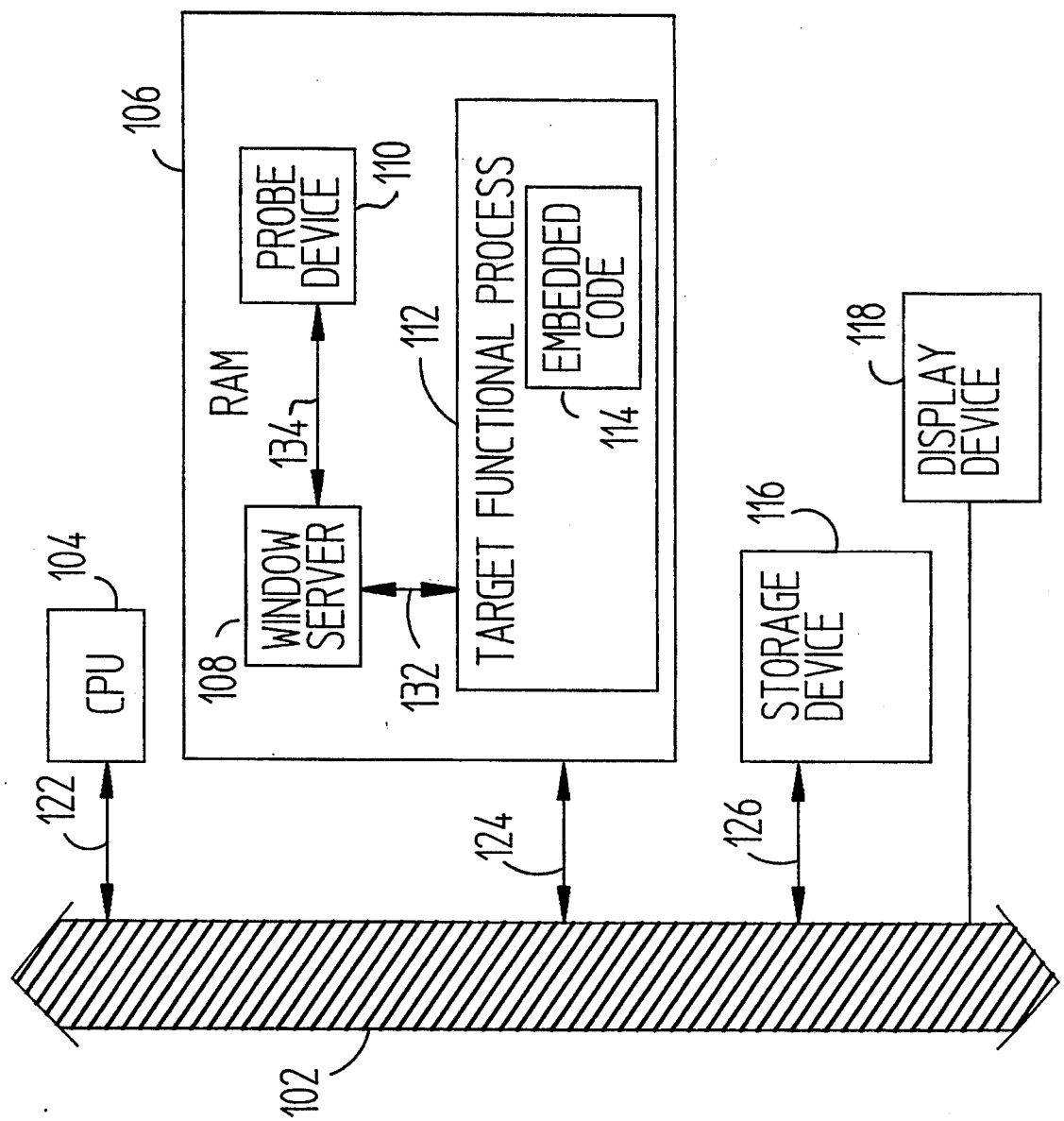
FIG. 1 is a diagram of an example computer system environment contemplated for use with embodiments of the present invention.

Environments in which embodiments of the present invention are envisioned to operate can be better explained with regard to FIG. 1. Referring now to FIG. 1, the present invention and its surrounding environment as contemplated by some embodiments of the present invention is shown. In these embodiments, a bus 102 is shown as being in communication with a central processing unit (CPU) 104 via a line 122. A random access memory (RAM) 106 is also shown as being in communication with the bus 102 via a line 124. Within the RAM 106 is a target functional process 112 with embedded code 114.

A window server 108 is shown in communication with the target functional process 112 via a line 132, and a probe device 110 is in communication with the window server 108 via a line 134. This facilitates the transference of the resource information from the target object within the target functional process 112 to the probe device 110, and vise versa.

Although FIG. 1 shows the target functional process 112, window server 108 and probe device 110 as existing in RAM 106, it should be understood that other types of memory devices could also be used, either in lieu of RAM 106 or in conjunction with it. For example, a storage device 116 (which is in communication with bus 102 via a line 126) is contemplated by embodiments of the present invention as being capable of storing various portions of the probe device 110, window server 108, or target functional process 112 where it is advantageous to do so. Embodiments of the present invention contemplate that this storage device can be any type of magnetic, electronic and/or optical storage device, or the like.

Embodiments of the present invention contemplate that a script (not shown) can be used to contain previously stored resource information for comparison with subsequently generated resource information.

Some embodiments of the present invention contemplate that a display device 118 is used to display the resource information. It should be noted that displaying this resource information can be done in conjunction with recording the resource information and/or comparing the resource information with other information.

Embodiments of the present invention contemplate that the environment shown in FIG. 1 could be any standard computer configuration, such as that of an IBM AT produced by IBM Corporation of Armonk, N.Y., or an HP 9000 from Hewlett-Packard Corporation of Palo Alto, Calif., or the like. In addition, embodiments contemplating multiple CPUs 104 could also be used with the present invention.

Some embodiments of the present invention contemplate that the window environment operates so that when the target functional process 112 is ready to receive the next event description (e.g., one which would commence probing) it makes a request to the window server 108 for it to send the event description. In order for the embedded code 114 to function properly, the present invention contemplates that the target functional process 112 is modified so that it makes its request for the next event description to the embedded code 114. The embedded code 114 then makes the request for the event description to the window server 108. This causes the window server 108 to send the next event description to the embedded code 114 rather than directly to the target functional process 112.

Figure 2:
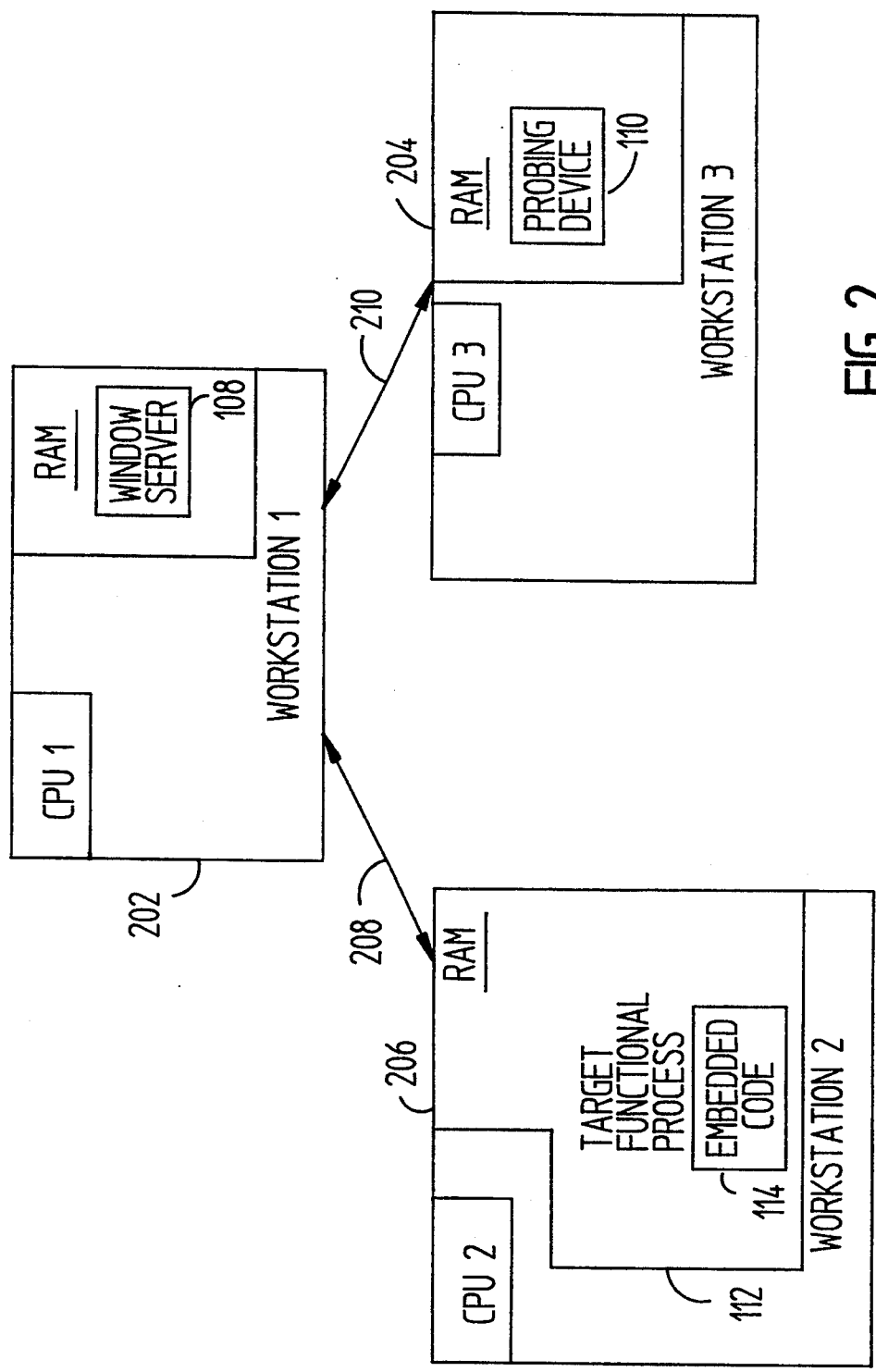
FIG. 2 is a diagram of a network environment contemplated for use with embodiments of the present invention.

Embodiments of the present invention further contemplate that the present invention can be used in a networked environment. An example of how the present invention would be used in such an environment can be seen from FIG. 2. Referring now to FIG. 2, three workstations (202, 204, 206) are shown. The target functional process 112 and embedded code 114 are shown in workstation 2 (206), which is in communication with workstation 1 (202) via a line 208.

The window server 108 located on workstation 1 (202) is contemplated to receive event descriptions, target object names and resource requests from the probe device 110 in workstation 3. The window server 108 then sends the event descriptions, object names and resource requests to the embedded code 114 in the target functional process 114 on workstation 2 (206).

Embodiments of the present invention contemplate that each of the workstations (202, 204, and 206) contain a CPU 104, RAM 106 and storage device 116, as discussed above regarding FIG. 1.

It should be understood that for the communication of information between the probe device 110 and the embedded code 114 in the target functional process 112, embodiments of the present invention contemplate that a message server or other type of communications port can be used in place of the window server 108. It should also be understood that the present invention can be used with multiple target functional processes on any number of different types of computer configurations or networked environments.

II. PROBE DEVICE AND EMBEDDED CODE

Figure 3:
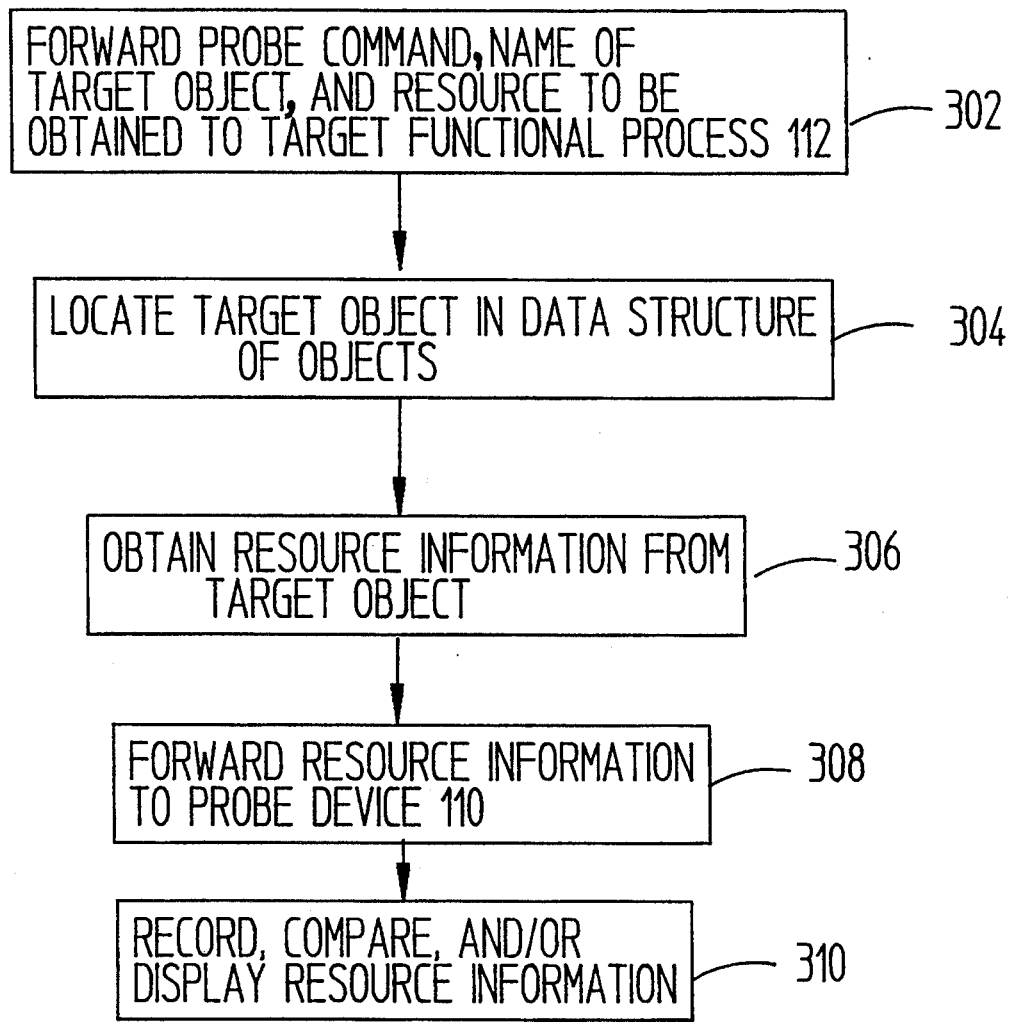
FIG. 3 is a flowchart of embodiments contemplated by the present invention.

Embodiments of a method of operation of the present invention are described using the flow chart of FIG. 3. Referring now to FIG. 3, the first step is to forward the event description (which would be a "probe command") which indicates that a resource is being requested, and also to forward the name of the target object and the resource to be obtained (i.e., the resource request) to the target functional process 112. This is indicated by a block 302. The probe command, the name of the target functional object and the resource request could be generated from any number of sources, including an electronic, magnetic and/or optical device such as an I/O device like storage device 116.

Some embodiments of the present invention contemplate that the above-noted information is transferred to the target object on the target functional process 112 as follows. First, a probe window is created on the window server 108 by the probe device 110. The probe device 110 is considered the "owner" of this probe window. Then, three different "properties" are created on this probe window. These "properties" can be thought of as "conduit comments" which are associated with individual windows, and into which data can be inserted. Thus, for purposes of embodiments of the present invention the name of the target object is placed into the first property and the resource request is placed into the second property. The third property is reserved for the resource information which is to be returned to the probe device 110. In these embodiments, it is contemplated that the probe device 110 generated property IDs which represent the names of these properties, and that these property IDs are given to the embedded code 114 so that it can have access to information within the properties.

It should be understood that the use of properties by the present invention contemplates the present invention's use in a window server environment that supports these entities. It should also be understood that other schemes to facilitate the transference of information from the probe device 110 to the target functional process 112 (and hence to the embedded code 114) are also contemplated.

The next step is to locate the target object in the data structure of objects. This is indicated by a block 304. As indicated above, embodiments of the present invention contemplate use in an environment where a data structure is used to maintain the names of each object used in the functional process (and within each object, the resources). Embodiments of the present invention contemplate that this data structure containing the objects is found using such devices as the X Window System Toolkit (as discussed in the Background Of The Invention section).

In obtaining the probe command, the name of target object and the resource request, the present invention (as indicated above) contemplates the use of embedded code 114 within target functional process 112 in such a way that all probe commands forwarded to the target functional process are instead directed to the embedded code 114. This allows the embedded code 114 to maintain control over the probing operation. It also allows the embedded code 114 to determine if what it received is a probe command or some other command used with some embodiments of the present invention.

The next step after the target object has been located in the data structure is to obtain the resource information from the target object. This is indicated by a block 306. Embodiments of the present invention contemplate that this is again accomplished using a device such as the X Window System Toolkit. Of course, it should be understood that other techniques for obtaining this resource information are also contemplated by the present invention.

Some embodiments of the present invention contemplate that the resource information, once obtained, is converted into a character string. Embodiments of the present invention contemplate that this is useful to provide a consistency in the data format of the resource information, since this information could potentially be of any number of different data types.

The next step is to forward the resource information to the probe device 110. This is indicated by a block 308. As indicated above, embodiments of the present invention contemplate that the resource information is posted to the third property that was created. The embedded code 114 then sends an indication to the probe device 110 that this property has been posted. Upon receipt of this indication, the probe device 110 will read the resource information out of this third property, and will "tag" the three properties previously used as now available for re-use.

The probe device 110 now has the resource information that it requested. Embodiments of the present invention contemplate that this information can be recorded, compared to other resource information, or just displayed on a display device. This is indicated by a block 310. However, other uses for this information are contemplated as well.

Figure 4:
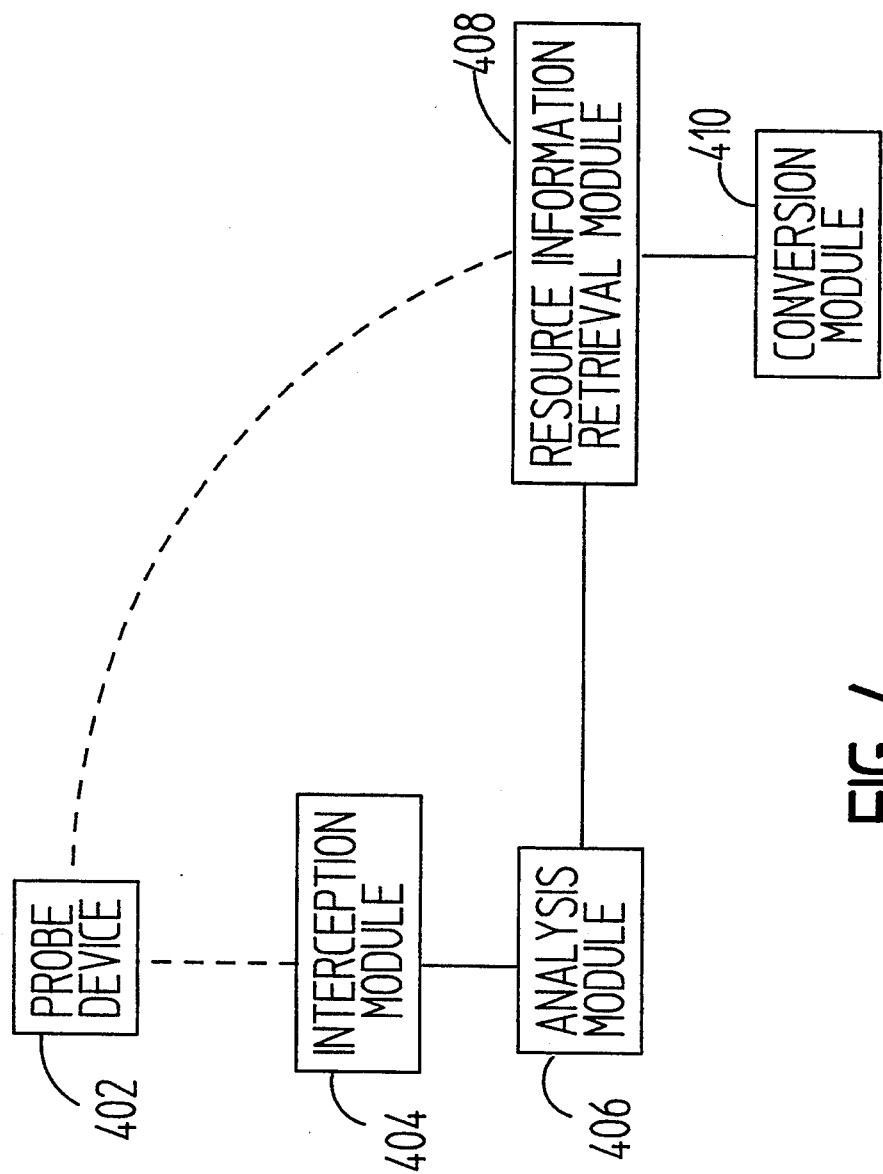
FIG. 4 is a block diagram of embodiments of the present invention.

Embodiments of a system of the present invention are described using the diagram of FIG. 4. Referring now to FIG. 4, a probe device 402 is used to forward the probe command, the name of the target object, and the resource request to the functional process 112. In addition, the probe device also is contemplated to record, compare and/or display the resource information.

An interception module 404 is contemplated to be used to "intercept" the information from the probe device 402. An analysis module 406 is a module which determines whether the interception module 404 received a probe command or some other command or unrelated information. If the analysis module 406 did receive a probe command, then a resource information retrieval module 408 is utilized.

The resource information retrieval module 408 obtains the target object name and the resource request from the properties, and forwards them to a conversion module 410. It is this conversion module 410 which, using the information given to it, obtains the resource information that was requested. It also converts the resource information into a character string (if it is not already in that form).

The resource information retrieval module 408 then forwards the resource information to the probe device 402.

It should be understood that the configuration of the modules and their functions described above are contemplated by some embodiments of the present invention, but that other embodiments contemplate other configurations and functions of these modules.

The scheme discussed above is shown in Appendix A: Pseudo Code for Probe Device. The pseudo code listed in Appendix A basically follows the constructs of the C programming language. It is envisioned that this pseudo-code can be used to generate workable source code for the present invention in a suitable language, such as C or PASCAL.

Other functions to be used with the embedded code include the following:

extracString(): Returns a pointer to a normal string that contains the same test as the XmString it was passed.

It should be understood that embodiments of the present invention can be implemented in hardware, software or a combination thereof. In such embodiments, the various components and steps would be implemented in hardware and/or software to perform the functions of the present invention. Any present available or future developed computer software language and/or hardware components can be employed in such embodiments of the present invention. In particular, the pseudo-code discussed above and listed in Appendix A can be especially useful for creating the software embodiments.

It should also be understood that the present invention is not limited to the embodiments indicated above, and that the examples presented above are merely for the purposes of illustration. The scope of the present invention should therefore be interpreted by the following claims as defined by the foregoing figures and text.

Appendix A:

Pseudo Code for Probe Device

```
/* Setup the antenna record with the display, probe window, and the cache of toplevel
windows and names. */
Antenna *setupAntenna()
{
    Antenna *rv = (antenna *) malloc(sizeof(Antenna));
```

```
    rv->dpy = XOpenDisplay(NULL);
    rv->propWindow = XCreateSimpleWindow(antenna->dpy,
            RootWindow(antenna->dpy, 0),1,1,1,1,0,0,0);

XSelectInput(antenna->dpy, RootWindow(antenna->dpy, 0),
            SubstructureNotifyMask); /* to see the creation/deletion of
                    toplevel windows. */

QueryWindowTree(rv);
    return(rv);
}
```

HP REF 191228
```
/*********************************************************************
 * Request the current value of a object resource.  The object name
 * is in widget and the resource name is in var.
 *********************************************************************/
Atom requestWidgetResource(Antenna *antenna, char *widget, char *var)
{
    Atom   widname, varname, retvalue;
    Window target;

if (antenna == NULL || antenna->dpy == NULL || antenna->probeWindow == NULL)
        return(0);

if ((target = firstTopLevelWindow(antenna, widget)) == 0)
        return(NO_WINDOW_ATOM);

retvalue = getAtom(antenna);

widname = getAtom(antenna);
    varname = getAtom(antenna);

if (retvalue == 0 || varname == 0 || widname == 0)
        return(0);

CHANGEPROPERTY(antenna, widname, widget);

CHANGEPROPERTY(antenna, varname, var);

send_client_msg_l(antenna->dpy,
            target,
            XE_TEST_REQUEST,
            XE_TEST_GET_VALUE,
            (long)antenna->probeWindow,
```

```
            (long)widname,
            (long)varname,
            (long)retvalue);
    return(retvalue);
}
``` main()

HP REF 191228

```
{

Antenna *ant = setupAntenna();
    char *objName;
    char *resName;
    char *probeValue;
    Atom a;
    Event e;

.
    .
    .

a = requestWidgetResource(ant, objName, resName);

while ((XNextEvent(ant->display, &e) &&
        e.type == PropertyNotify &&
        e.xany.window == ant->probeWindow &&
        e.xproperty.state == PropertyDelete &&
        e.xproperty.atom = a) == 0)
    { maintainAntenna(ant, &e);
    }
    getprop(ant->display, ant->probeWindow, a);

.
    .
    .

}
```

Types used:
    Antenna is a record with the id of probeWindow and a pointer into the cache of toplevel windows.

Node  is a record for events to be generated. The important fields are the type of event to generate, the name of the target object, the coordinates within the target object, and the keys and buttons being pressed/released.

Atom   is defined by the X libraries.

HP REF 191228

Event   is defined by the X libraries.

Functions not defined above:
QueryWindowTree()

>Queries the X window server about the current toplevel windows. The window manager name property is stored in a data structure with the window ID of each toplevel window.

MaintainAntenna()

>Notes window creation and deletion events and keeps the data structure of window IDs and names current.

firstTopLevelWindow()

>Searched the data structure of window names for the first one that matches the name we are interested in.

CHANGEPROPERTY()

>Writes the given data to the specified property on the window "antenna->probeWindow". The property has the type of a string of characters.

getprop()

>Returns the string held in the specified property.

Pseudo Code for Embedded Code

```
/* compares strings x and y.  The strings can be delimited by '.', '*', or
   '\0'.  Returns 0 if the strings don't match, 1 if they do.  The delimiters
   do not need to match for the strings to match. */
static int widgetMatch(XeString x, XeString y)
{
   while (*x != (XeChar)'.' && *x != (XeChar)'*' && *x != (XeChar)'\0')
      if (*(x++) != *(y++)) return(0);

return(*y == (XeChar)'.' || *y == (XeChar)'*' || *y == (XeChar)'\0');
```

HP REF 191228

```
}
```

```
/* Returns nonzero if the widget/class names of wid and its ancestors
   can match the string "name". Generations of widgets may be skipped
   between names seperated by an astrisk. It is assumed that that first
   char is a '*' or a '.'. */
static int pathmatch(Widget wid, XeString name, XeString nameend)
{ XeString mark; /* first char of widget name to compare */ for (mark = nameend-1; mark >= name; mark--)
     if (*mark == (XeChar)'.' || *mark == (XeChar)'*')
     { mark++;
       break;
     }
   if (wid == NULL || mark == name) return(0);

if (widgetMatch(XtName(wid), mark) ||
       widgetMatch(XtClass(wid)->core_class.class_name, mark))
   { if (name +1 == mark)
       return(*name == (XeChar)'*' ||
           (*name == (XeChar)'.' && XtParent(wid) == NULL));
     if (pathmatch(XtParent(wid), name, mark - 2))
       return(1);
     if (*(mark-1) == (XeChar)'*')
       while ((wid = XtParent(wid)) != NULL)
         if (pathmatch(wid, name, mark - 2)) return(1);
   }
   return(0);
}

/* Return the widget of the named in the widgetpathname "name". The idea
   here is to walk the widget tree and use the last name as a filter to
   find the widget quickly. */
static Widget walkWidgetTree(Widget root, XeString name, XeString last)
{ Widget wid;
  int i;
  XeString str;

if (root == NULL || !XtIsRectObj(root)) return(NULL);

if (((str = XtName(root)) && (strcmp(last, str) == 0) ||
       ((str = XtClass(root)->core_class.class_name) && strcmp(last, str) == 0))
     &&
       pathmatch(root, name, name + strlen(name)))
     return(root);

if (!XtIsWidget(root)) return(NULL);
```

```
if (XtIsComposite(root))
   for (i=0; i< ((CompositeRec *) root)->composite.num_children; i++)
      if (wid = walkWidgetTree(((CompositeRec *) root)->composite.children[i],
                    name, last))
         return(wid);

for (i=0; i < root->core.num_popups; i++)
      if (wid = walkWidgetTree(root->core.popup_list[i], name, last))
         return(wid);

return(NULL);
}

/* Return the widget named in the widgetpathname "name".  "root" points
   to the toplevel widget.  The first name in the widget list is removed
   and we assume that it matches the application name or class. */
static Widget widgetSearch(Widget root, XeString name)
{  XeString i;
   XeString firstSep, lastName;
   if (name == NULL || root == NULL) return(NULL);

for (firstSep=name; *firstSep != (XeChar)0; firstSep++)
      if (*firstSep == (XeChar)'.' || *firstSep == (XeChar)'*') break;

if (*firstSep == (XeChar)0) return(0);

for (i=firstSep; *i != (XeChar)0; i++)
      if (*i == (XeChar)'.' || *i == (XeChar)'*') lastName = i+1;

return(walkWidgetTree(root, firstSep, lastName));
}

HP REF 191228

/* Return the widget of the named in the widgetpathname "name".  "w" is any
   window on display "dsp" whose widget is in the same widget tree. */
static Widget widgetSearchWindow(Display *dsp, Window w, XeString name)
{  Widget wid = XtWindowToWidget(dsp, w);

if (wid == NULL) return(NULL);

while (XtParent(wid))
      wid = XtParent(wid);

return(widgetSearch(wid, name));
}
```

```
/* This is like strdup except that it uses XtMalloc(). */
XeString myXtdup(XeString x)
{   XeString rv = (XeString)XtMalloc(strlen(x) +1);
    if (rv) strcpy(rv, x);
    return(rv);
}

/* Return a pointer to a string describing the type or the resource. The
   type may be specified in the resource name (eg. "x:Int") or if no colon is
   present the type is read out of the resource list of the widget. The
   resouce name is altered to delete the colon and the type if one is
   present. The returned string must be freed with XtFree(). */
static String get_resource_type(Widget wid, String res_name)
{
    XtResourceList res_list;
    Cardinal num_res;
    String type = NULL;
    String colon;
    int i;

if (colon = strchr(res_name, ':'))
      { type = myXtdup(colon+1);
        *colon = '\0';
        return(type);
      }
```

HP REF 191228

```
    XtGetResourceList(XtClass(wid), &res_list, &num_res);
    for(i=0; i<num_res; i++) {
      if(!strcmp(res_name, res_list[i].resource_name)) {
        type = myXtdup(res_list[i].resource_type);
        break;
      }
    }
    XtFree((char *) res_list);
    if (type) return(type);

if (XtParent(wid) == NULL) return(type);
    XtGetConstraintResourceList(XtClass(XtParent(wid)), &res_list, &num_res);
    for(i=0; i<num_res; i++) {
      if(!strcmp(res_name, res_list[i].resource_name)) {
        type = myXtdup(res_list[i].resource_type);
        break;
      }
    }
    XtFree((char *) res_list);
    return(type);
}
```

/* Given a widget, resource and a type this returns an XeString representing
the value of the widget's resource after being converted from the original
type to an XeString as best as possible.

The routines doing the conversion of each type are tied to some definition
of the name of that type and the C code that implements that type. A
reference indicating where the type is defined is given where known. */
```
static XeString getAsString(Widget wid, XeString res, XeString type)
{   char *rv;
    Arg arg[1];

if (strcmp(type, "XmString") == 0)
     { XmString value;
       XtSetArg(arg[0], res, &value);
       XtGetValues(wid, arg, 1);
       return(extractString(value));
     }
```

HP REF 191228

```
    if (strcmp(type, "Int") == 0 ||
        strcmp(type, "HorizontalInt") == 0 ||
        strcmp(type, "VerticalInt") == 0)
     { int value;
       XtSetArg(arg[0], res, &value);
       XtGetValues(wid, arg, 1);
       rv = XtMalloc(20);
       sprintf(rv, "%d", value);
       return(rv);
     }
```

/* Other integer types such as Position, Dimension, Long, Short, etc are
converted to a string in a similar manner. They are not show here for
brevity. */

```
    if (strcmp(type, "String") == 0)          /* Intrinsic.h */
     { String value = XeTestNOTFOUND;
       XtSetArg(arg[0], res, &value);
       XtGetValues(wid, arg, 1);
       if (value == NULL) return(myXtdup((XeString)XeTestNULL));
       return(myXtdup((XeString)value));
     } if (strcmp(type, "char") == 0)            /* C */
     { XeChar value;
       XtSetArg(arg[0], res, &value);
       XtGetValues(wid, arg, 1);
       rv = XtMalloc(2);
```

```
    rv[0] = (char) value;
    rv[1] = '\0';
    return(rv);
  } if (strcmp(type, "Boolean") == 0)      /* Intrinsic.h */
  { Boolean value;
    XtSetArg(arg[0], res, &value);
    XtGetValues(wid, arg, 1);
    return(myXtdup(value ? "True" : "False"));
  } if (strcmp(type, "Bool") == 0)         /* Xlib.h */
  { Bool value;
```

HP REF 191228

```
    XtSetArg(arg[0], res, &value);
    XtGetValues(wid, arg, 1);
    return(myXtdup(value ? "True" : "False"));
  } if (strcmp(type, "Pixel") == 0)        /* Intrinsic.h */
  { Pixel value;
    XColor xc;
    XWindowAttributes xwa;
    XtSetArg(arg[0], res, &value);
    XtGetValues(wid, arg, 1);
    XGetWindowAttributes(XtDisplay(wid), XtWindow(wid), &xwa);
    xc.pixel = value;
    XQueryColor(XtDisplay(wid), xwa.colormap, &xc);

rv = XtMalloc(20);
    sprintf(rv, "#%04x%04x%04x", xc.red, xc.green, xc.blue);
    return(rv);
  } if (strcmp(type, "Widget") == 0)       /* Intrinsic.h */
  { Widget value;
    XtSetArg(arg[0], res, &value);
    XtGetValues(wid, arg, 1);
    return(myXtdup(XtName(value)));
  } if (strcmp(type, "Atom") == 0)         /* Intrinsic.h */
  { Atom value=0;

char* txt;
    XtSetArg(arg[0], res, &value);
```

```
    XtGetValues(wid, arg, 1);
    if (value == 0) return(myXtdup("ZERO"));
    txt = XGetAtomName(XtDisplay(wid), value);  /* Needs an X error trap
                                    for BadAtom */
    rv = myXtdup(txt);
    XFree(txt);
    return(rv);
}
```

HP REF 191228

```
    rv = XtMalloc(40+strlen(type));
    sprintf(rv, "ERROR - No conversion for type '%s'", type);
    return(rv);
}

/* This will get a resource from an object,
    convert it to a string and then place the result in a window property.
    data.l[1] is the window holding properties.
    data.l[2] is an atom of a property holding the widget name.
    data.l[3] is the atom of the property holding the resource name.
    data.l[4] is the atom of the property where the value will be stored.

This call now returns errors messages if the widget is not found or
    if the resource is not found.
*/
static void get_widget_resource_value(XClientMessageEvent *event)
{
  Display *display = event->display;         /* display to use */
  Window requester = event->data.l[1];       /* window with properties to
read */
  Atom wid_atom = (Atom) event->data.l[2];   /* atom of property holding
widget name */
  Atom res_atom = (Atom) event->data.l[3];   /* atom of property holding
resource name */
  Atom val_atom = (Atom) event->data.l[4];   /* atom of property to receive value
*/
  XeString wid_name = get_prop(display, requester, wid_atom, True);
  XeString res_name = get_prop(display, requester, res_atom, True);
  XeString value_string;
  XeString type;

Widget selection = widgetSearchWindow(display, event->window, wid_name);

if (! selection)
    value_string = myXtdup((XeString)"ERROR - widget not found");
else
if (! res_name)
```

```
      value_string = myXtdup((XeString)"ERROR - bad resource name");
    else
      {

HP REF 191228

{ type = get_resource_type(selection, res_name);
          if (! type)
             value_string = myXtdup((XeString)XeTestNOTFOUND);
          else
            { value_string = getAsString(selection, res_name, type);
              XtFree(type);
            }
        }
        XtFree(res_name);
      }
    if (value_string == NULL)
       value_string = myXtdup((XeString)XeTestNULL);

XChangeProperty(display, requester, val_atom, XA_STRING, 8,
                PropModeReplace, (unsigned char *) value_string,
                strlen(value_string)+1);
    XtFree(wid_name);
    XtFree(value_string);
}

/* Processes incomming client message events. If the event is a valid command
   this function returns True, otherwise it returns False. This is to allow
   the calling routine to know if it should pass this client message on to
   the application. Messages are only processed if the event message type
   is XE_TEST_REQUEST and the low byte of the first long word data field
   is valid minor opcode. */
Boolean clientMessageReceived(XClientMessageEvent *event)
{
   XeTestInit(event->display);   /* Set XE_TEST_REQUEST before comparing atom
*/ if(event->message_type != XE_TEST_REQUEST) return(False);
   switch (255 & event->data.l[0])

{
   case XE_TEST_GET_VALUE:
      get_widget_resource_value(event);
      break;
   /* cases for other commands deleted */
   default: return(False);
```

HP REF 191228

```
     }
     return(True);
}

/* XtApp replacements */

/* Get an XEvent and loop until we get one that is not a command for
     clientMessageReceived.  If spyWindow is not zero, forward the event to
     the interested test tool.
*/
void XeAppNextEvent(XtAppContext app, XEvent *event)
{
     do XtAppNextEvent(app, event);
     while (((event->type == ClientMessage) && clientMessageReceived((XClientMessageEvent *) event)));
} void XeAppMainLoop(XtAppContext app)
{
     XEvent event;

for (;;) {
          XeAppNextEvent(app, &event);
          XtDispatchEvent(&event);
     }
}
```

What is claimed is:

1. An object probing system for probing a target object, the target object having a name, within a target functional process to obtain resource information of the target object, comprising:
   (a) a device for generating a probe command, the name of the target object and a resource request;
   (b) probe means for forwarding said probe command, the name of the target object and said resource request to the target functional process;
   (c) a window server for facilitating the transfer of said probe command, the name of the target object and said resource request between said probe means and the target functional process;
   (d) interception means for intercepting said probe command, the name of the target object and said resource request;
   (e) conversion means for obtaining the resource information from the target object using the name of the target object and said resource request;
   (f) resource information retrieval means for forwarding the resource information obtained from said conversion means to said probe means.

2. The object probing system of claim 1, further comprising analysis means for distinguishing commands received from said interception module from other information.

3. The object probing system of claim 1, wherein said conversion means of said element (e) further comprises means for converting the resource information into a character string.

4. A computer-based object probing method for probing a target object within a target functional process to obtain resource information of the target object using a window server, the target object having a name, the method comprising the steps of:
   (1) forwarding, by a probe device, a probe command to the target functional process;
   (2) receiving, by embedded code within the target functional process, the probe command;
   (3) creating a first conduit comment on the window server, the first conduit comment having a first ID;

(4) creating a second conduit comment on the window server, the second conduit comment having a second ID;

(5) forwarding, by the probe device, the name of the target object, together with the first ID, and a resource request, together with the second ID, to the target functional process;

(6) obtaining the resource information from the target object using the name of the target object and the resource request; and (7) forwarding the resource information to the probe device; wherein the first ID and second ID are forwarded to the target functional process to facilitate the obtaining of the name of the target object and the resource request.

5. The object probing method of claim 4, further comprising step of:

(8) creating a third conduit comment, having a third ID, on the window server with which step (7) forwards the resource information to the probe device.

6. A computer-based object probing method for probing a target object, the target object having a name, within a target functional process to obtain resource information of the target object using a window server, comprising the steps of:

(1) forwarding, by a probe device, a probe command to the target functional process;

(2) intercepting, by embedded code within the target functional process, the probe command;

(3) creating a first conduit comment on the window server, the first conduit comment having a first ID;

(4) creating a second conduit comment on the window server, the second conduit comment having a second ID;

(5) forwarding, by the probe device, the name of the target object, together with the first ID, and a resource request, together with the second ID, to the target functional process;

(6) locating the target object within the target functional process using the name of the target object;

(7) obtaining the resource information from the target object using the name of the target object and the resource request; and (8) forwarding the resource information to the probe device; wherein the first ID and second ID are forwarded to the target functional process to facilitate the obtaining of the name of the target object and the resource request.

7. The object probing method of claim 6, further comprising the step of:

(9) creating a third conduit comment, having a third ID, on the window server with which said step (7) forwards the resource information to said probe device.

8. The object probing method of claim 7, further comprising the step of

(10) tagging said first, second and third conduit comments for re-use after the completion of said step (8).

9. The object probing method of claim 8, further comprising the step of:

(11) recording the resource information for a later comparison with subsequently obtained resource information from the same resource.

* * * * *